(12) United States Patent
Bauer

(10) Patent No.: US 7,267,631 B2
(45) Date of Patent: Sep. 11, 2007

(54) AUTOMATIC TRANSMISSION HAVING A START-UP CLUTCH

(75) Inventor: Karl-Heinz Bauer, Graben-Neudorf (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 11/054,935

(22) Filed: Feb. 10, 2005

(65) Prior Publication Data

US 2005/0137049 A1   Jun. 23, 2005

Related U.S. Application Data

(63) Continuation of application No. 10/318,617, filed on Dec. 13, 2002, now abandoned.

(30) Foreign Application Priority Data

Dec. 14, 2001  (DE) .............................. 101 61 815

(51) Int. Cl.
*F16H 1/32* (2006.01)
(52) U.S. Cl. ...................... 475/278; 475/271; 475/275; 475/277; 475/284; 475/288; 475/296; 475/313; 475/325; 475/330
(58) Field of Classification Search ................ 475/271, 475/275, 277, 278, 284, 288, 296, 311, 313, 475/323, 325, 330
See application file for complete search history.

(56) References Cited

U.S. PATENT DOCUMENTS 4,699,022 A   10/1987  Stadt

| 5,106,352 A | | 4/1992 | Lepelletier |
| 5,437,584 A | * | 8/1995 | Garrett et al. ............... 475/275 |
| 5,707,312 A | | 1/1998 | Sefcik |
| 5,938,559 A | | 8/1999 | Sumi .......................... 475/278 |
| 6,139,463 A | | 10/2000 | Kasuya et al. ............... 475/275 |

(Continued)

FOREIGN PATENT DOCUMENTS

DE        29 35 361 A       3/1981

(Continued)

OTHER PUBLICATIONS

"Transmission in vehicles" Conference: Jun. 19-20, 2001 "E-Automat Automatikgetriebe mit Esprit" Dr. P. Tenberge VDI, Chemnitz. VDI-Berichte, Nr.1610, 2001 pp. 455-479.

*Primary Examiner*—David D. Le
(74) *Attorney, Agent, or Firm*—Bliss McGlynn, P.C.

(57) ABSTRACT

An automatic transmission having a start-up clutch assembly includes a transmission housing, an input drive shaft, and an output drive shaft. An input planetary gear assembly is also included that has a sun gear and a ring gear, with a plurality of planet gears disposed therebetween, the ring gear operatively connected to the input drive shaft. A start-up clutch is operatively disposed between the transmission housing and the sun gear and is adapted to allow the sun gear to freely rotate when the start-up clutch is disengaged so that no torque is transferred. The start-up clutch is further adapted to engage and hold the sun gear stationary so that torque is fully transferred. The start-up clutch is further still adapted to provide a varying and controllable slipping interaction between the disengaged and engaged positions at vehicle start-up thereby providing the vehicle with a smooth transition from stationary to moving.

4 Claims, 4 Drawing Sheets

U.S. PATENT DOCUMENTS

| | | |
|---|---|---|
| 6,159,123 A | 12/2000 | Gumpoltsberger |
| 6,165,097 A * | 12/2000 | Hebbale et al. ............. 475/280 |
| 6,244,402 B1 | 6/2001 | Domian |
| 6,524,208 B1 | 2/2003 | Hollermann |
| 6,723,018 B2 * | 4/2004 | Hayabuchi et al. ......... 475/276 |
| 6,729,990 B1 | 5/2004 | Haupt |
| 6,805,648 B1 | 10/2004 | Ehrlinger |
| 2002/0098937 A1* | 7/2002 | Coffey ........................ 475/280 |

FOREIGN PATENT DOCUMENTS

| | | |
|---|---|---|
| DE | 196 25 355 A1 | 1/1998 |
| DE | 197 39 906 A1 | 3/1999 |
| DE | 198 17 865 A1 | 10/1999 |
| DE | 199 09 424 A1 | 8/2000 |
| DE | 199 32 613 A1 | 1/2001 |
| DE | 199 34 696 A1 | 5/2001 |
| EP | 0 342 672 A | 11/1989 |
| EP | 0 434 525 B1 | 6/1991 |
| WO | WO99/00611 A | 1/1999 |
| WO | WO 00/57082 | 9/2000 |

* cited by examiner

AUTOMATIC TRANSMISSION HAVING A START-UP CLUTCH

CROSS-REFERENCE TO RELATED APPLICATIONS

This is a continuation application of U.S. patent application Ser. No. 10/318,617 entitled "Device for Bringing up to Speed a Vehicle Having an Automatic Transmission" and filed on Dec. 13, 2002 now abandoned, which claims benefit of German Patent Application 101 61 815.8 filed on Dec. 14, 2001.

BACKGROUND OF THE INVENTION

1. Field of the Invention

The present invention relates, generally to an automatic transmission for a vehicle and, more specifically, to an automatic transmission having a start-up clutch.

2. Description of the Related Art

Conventional multi-stage or multi-gear automatic transmissions are generally provided with a start-up device for providing the necessary torque translation from the engine to the transmission to initiate movement of the vehicle from a stationary position. Most often, the start-up device takes the form of a fluid-coupled, or hydrodynamic torque converter. The torque converter provides torque amplification at vehicle start-up through a predetermined vehicle speed at which point the fluid coupling is no longer needed.

An example of a conventional automatic transmission having a hydrodynamic torque converter as start-up device is schematically illustrated in FIG. 4. The automatic transmission 26 includes a transmission housing 7 having an input shaft 1 and an output shaft 2. While various component arrangements have been employed to effect gear changes to establish various gear ratio translation relationships between the input and output shafts 1 and 2, this example includes an input planetary gear assembly 4, a double output planetary gear assembly 5, three clutches A, B, and E, and two brakes C and D.

The input planetary gear assembly 4 includes a sun gear 12, a planetary gear 13 held by a planet gear carrier, or planetary arm 15, and an internal, or ring gear 14. As illustrated, the sun gear 12, the planetary gear 13, and the ring gear 14 engage in a conventional manner, namely the sun gear 12 is in engagement with the planetary gear 13, and the planetary gear 13 with the ring gear 14.

The double output planetary gear assembly 5 likewise includes a first sun gear 16, a first planetary gear 17 supported by a first planet gear carrier, or planetary arm 21, a second sun gear 20, a second planetary gear 18 held by a second planet gear carrier, or planetary arm 22, and a ring gear 19. The first sun gear 16 and the first planetary gear 17 both operatively engage the second planetary gear 18 of the output planetary gear 5.

A further sun gear 20 is shown in this illustrative embodiment. As shown in FIG. 4, the input shaft 1 is connected with the ring gear 14 of the input planetary gear assembly 4. The sun gear 12 of the input planetary gear assembly 4 is fixed against rotation to the transmission housing 7. The planet arm 15 is selectively connectable to the first sun gear 16 of the output planetary gear assembly 5 via the clutch A and is also selectively connectable with the second sun gear 20 via clutch B.

The two joined planet arms 21 and 22 of the output planetary gear assembly 5 are selectively connectable to be fixed against rotation with the gear housing 7 via the brake D. Clutch E provides a selective connection between the joined planet arms 21 and 22 and the input shaft 1. The second sun gear 20 is either selectively connectable to the planet arm 15 of the input planetary gear assembly 4 via the clutch B, or is selectively connectable as a connection fixed against rotation to the gear housing 7 by brake C. Additionally, the ring gear 19 is directly connected to the output shaft 2.

Thus, the selective engagement of the five shift elements, namely the three clutches A, B, and E as well as the two brakes C and D effects the various gear translation relationships, or ratios between the input shaft 1 and the output shaft 2 by controlling which gear elements of the planetary gear assemblies 4 and 5 operatively effect the rotation of the others. In this example of the prior art, there are six forward gears, one neutral position, and one reverse gear. As further illustrated in FIG. 4, this automatic transmission 26 employs a hydrodynamic torque converter 3 as a start-up device. The torque converter 3 includes an impeller 8, a turbine wheel 9 and stator 10. The turbine wheel 9 is fixedly mounted to the input shaft 1 and the stator 10 is connected with the gear housing 7 via a one-way clutch 11.

The impeller 8, turbine wheel 9 and stator 10 further include a plurality of blades or vanes that act to direct the movement of hydraulic fluid so that the mechanical energy of the rotating impeller 8 is converted to hydrokinetic energy, transferred to the turbine wheel 9 through the stator 10 and then converted back into mechanical energy to rotate the turbine wheel 9 and the input shaft 1. The torque converter 3 further includes a lock-up clutch 6 that makes a direct connection between the motor shaft M and the input shaft 1 after the vehicle has reached a predetermined speed where the fluid coupling of the torque converter 3 is no longer needed.

Although this type of arrangement has generally worked well for its intended purpose, there remains room for improvement. More specifically, the torque converter is large and bulky and requires a pump (not shown) to supply hydraulic fluid to the impeller. The size, weight and fluid coupling of the torque converter cause parasitic losses that reduce the efficiency of the transmission and the vehicle. Further, the torque converter and its supporting elements are complex and costly to produce.

Accordingly, there remains a need in the related art for an automatic transmission having a start-up device that eliminates the need for a hydrodynamic torque converter, has less size and weight, and provides greater efficiency and more cost effective production by employing fewer components. There also remains a need for this type of transmission that also continues to provide a smooth automatic transition for the vehicle from stationary to moving.

SUMMARY OF THE INVENTION

The disadvantages of the related art are overcome by the present invention of an automatic transmission having a start-up clutch assembly that includes a transmission housing, an input drive shaft operatively connected to a motor shaft of an engine that is adapted to transfer torque from the engine to the transmission, and an output drive shaft that is operatively coupled to a vehicle drive shaft. An input planetary gear assembly is also included that has a sun gear and a ring gear, with a plurality of planet gears disposed therebetween, the ring gear operatively connected to the input drive shaft. A output planetary gear assembly is operatively coupled to the input planetary gear assembly and to the output drive shaft. The input planetary gear assembly and the output planetary gear assembly are adapted to provide a plurality of selectively operable gear ratios between the input drive shaft and the output drive shaft. A start-up clutch is operatively disposed between the transmission housing and the sun gear and is adapted to allow the sun gear to freely rotate when the start-up clutch is disengaged so that no torque is transferred from the input planetary gear assembly to the output planetary gear assembly. The start-up clutch is further adapted to engage and hold the sun gear stationary so that torque is fully transferred from the input planetary gear assembly to the output planetary gear assembly. The start-up clutch is further still adapted to provide a varying and controllable slipping interaction between the disengaged and engaged positions at vehicle start-up thereby providing the vehicle with a smooth transition from stationary to moving.

It is envisioned, that in accordance with the present invention, the start-up clutch is a friction type start-up clutch with controllable and adjustable slip. In contrast to conventional torque converters, the start-up clutch of the present invention has fewer, less complex components, with lighter weight. Thus, the parasitic losses associated with conventional transmission designs that employ torque converters are eliminated or greatly reduced. This provides increased efficiency and cost savings in regard to transmission manufacturing and assembly as well as increased vehicle efficiency and lower operating costs.

Furthermore, in operation, the start-up clutch of the present invention is open and disengaged when the vehicle is stationary. When it is desired to cause the vehicle to move, the start-up clutch is slowly engaged in a controlled manner, decreasing the slip and slowly increasing the torque transfer, until the start-up clutch is fully engaged at some predetermined vehicle speed to allow a full transfer of torque from the input shaft to the output shaft. Thus, in addition to the above-mentioned advantages, the start-up clutch of the present invention also provides a smooth transition as the vehicle is brought from a stationary position to moving at speed.

Other objects, features and advantages of the present invention will be readily appreciated, as the same becomes better understood after reading the subsequent description taken in connection with the accompanying drawings.

DETAILED DESCRIPTION OF THE INVENTION

Figure 1:
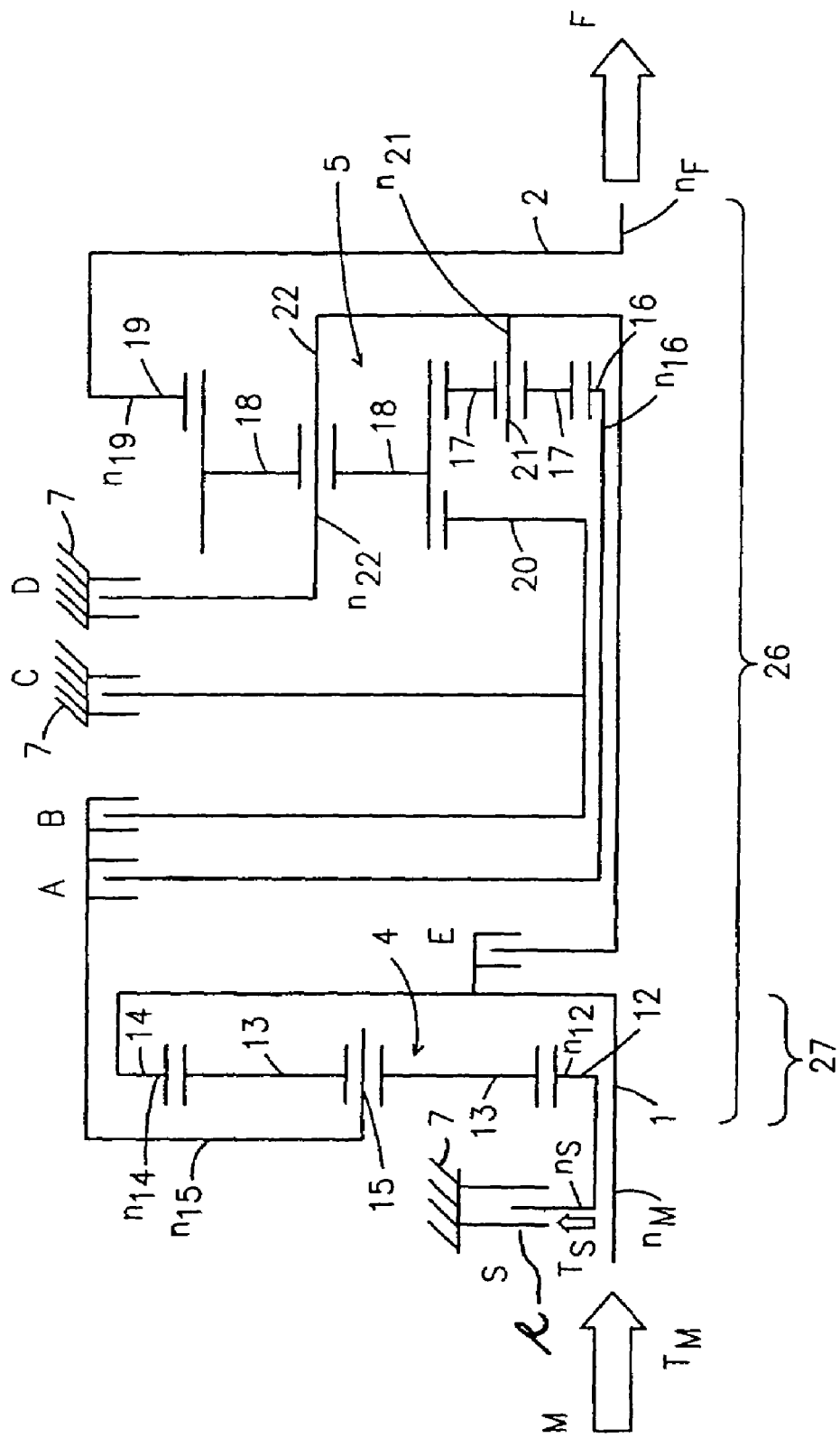
FIG. 1 a schematic illustration of an automatic transmission of the present invention having a start-up clutch.

The automatic transmission having a start-up clutch in accordance with the present invention is schematically illustrated and generally indicated at 26 in FIG. 1. The transmission 26 of the present invention includes an input drive shaft 1 continuously coupled to the motor via motor shaft M, an output drive shaft 2 continuously coupled with the vehicle drive shaft F, an input planetary gear assembly 4, a double output planetary gear assembly 5, three clutches A, B and E, and two brakes C and D. These components are contained within a transmission housing 7.

The input planetary gear assembly 4 includes a sun gear 12, a plurality of planetary gears 13 held by a planet arm, or planetary gear carrier 15, and an internal, or ring gear 14. As illustrated, the sun gear 12, the planetary gears 13, and the ring gear 14 are engaged in a conventional manner, namely the sun gear 12 is in engagement with the planetary gear 13, and the planetary gear 13 with the ring gear 14.

The double output planetary gear assembly 5 includes a first sun gear 16, a first planetary gear 17 supported by a first planet arm, or planetary gear carrier 21, a second sun gear 20, a second planetary gear 18 held by a second planet arm, or planetary gear carrier 22, and an output ring gear 19. The present invention further includes a controlled slip friction type start-up clutch S. The start-up clutch S provides a controllable connection between the transmission housing 7 and the sun gear 12 of the input planetary drive 4. To place the transmission in its first gear configuration and allow vehicle start-up, or movement from a stationary position, clutch A and brake D are closed, while clutch B, clutch E, and brake C are in the open position. This provides the lowest, or first gear ratio, through the input and output planetary gear assemblies 4 and 5, to the output drive shaft 2. It should be appreciated that the input planetary gear assembly 4 is also considered a reduction gear assembly 27 when either clutch A or B are engaged. However, if clutch E is engaged, no reduction is employed and all the torque provided by the input drive shaft 1 is directly transferred to the double output planetary gear assembly 5.

Prior to initializing vehicle start-up, the start-up clutch S is also open. The input torque and rotation of the input drive shaft 1 provided by the motor shaft M of the internal combustion engine is coupled directly to the ring gear 14 so that the speed of ring gear $n_{14}$ is the same speed as the input shaft $n_M$.

The planet arm 15 of the input planetary drive 4 is connected with the drive shaft 2 through the output planetary drive 5. However, since the sun gear 12 is unrestrained by the start-up clutch S prior to vehicle start-up and is free to rotate, the ring gear 14 causes the planet gears 13 to rotate and spin the sun gear 12 so that no torque is transferred to the planet arm 15. Thus, with the start-up clutch S disengaged, the vehicle is not moving and the planet arm 15 rotational speed $n_{15}$ and the vehicle drive shaft rotation speed $n_F$ is zero:

$$n_{15}=n_F=0.$$

Since the reduction stage 27 is not an input planetary drive 4 with a negative level of translation in the described case the sun gear 12 rotates against the motor direction of rotation with the rotational speed $$n_s=i_o \times n_M.$$

When vehicle start-up is initiated, a regulator R applies force to the start-up clutch S to creating a slipping interaction between the sun gear 12 and the transmission housing 7 to slow and effect the rotation of sun gear 12. Thus, the sun gear 12 of the input planetary gear assembly 4 is now no longer completely free to rotate. As the ring gear 14 continues to rotate, each of the planet gears 13 are rotated about the sun gear 12, and with the rotation of the sun gear 12 being slightly restricted, the planet arm 15 is forced to begin revolving. The revolution of the planet arm 15 in turn transfers some portion of the input torque to the output planetary gear assembly 5.

Figure 2:
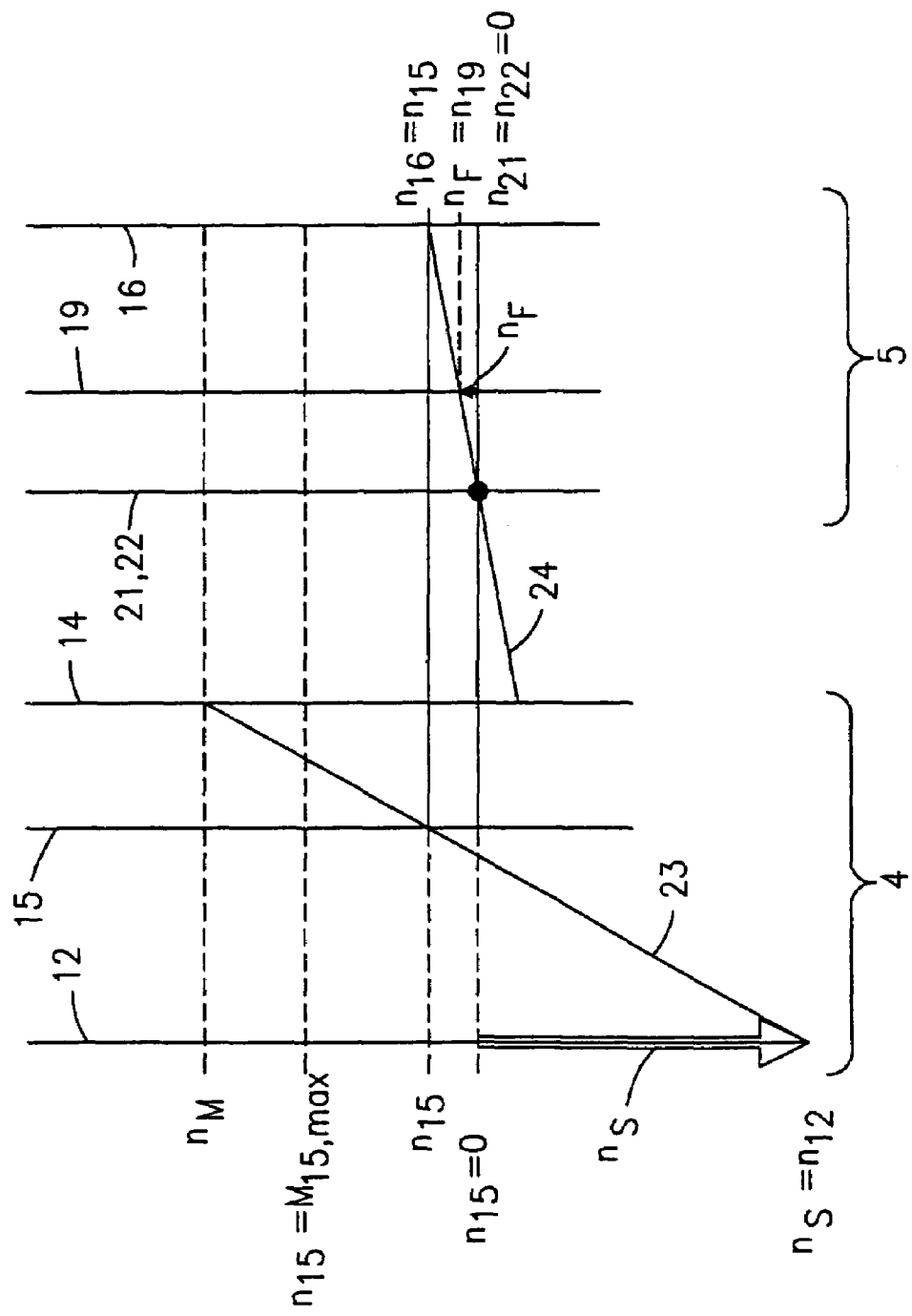
FIG. 2 is a diagram illustrating the various gear ratios and relative component speeds of the present invention illustrated in FIG. 1 when vehicle movement is being initiated.

The diagram in FIG. 2 illustrates the various gear ratios and relative component speeds of the present invention when vehicle start-up and movement is being initiated. The left side of the diagram represents the input planetary gear assembly 4. The right side of the diagram represents the output planetary gear assembly 5. The vertical lines represent the relative rotational speeds of the individual gears and assemblies shown in FIG. 1. Thus, the left line with reference number 12 is associated with the sun gear 12 of the input planetary gear assembly 4, the central line with reference number 15 is associated with the planet arm 15 and the right line with reference number 14 is associated with the ring gear 14. Similarly, the lines from left to right with reference numbers 21, 22 (inner planet arm and outer planet arm), 19 (internal gear) and 16 (sun gear) are associated with the relative speeds of these components of the double output planetary gear assembly 5.

As shown in FIG. 2, the motor shaft input speed is represented as horizontal line $n_M$. Since, the ring gear 14 rotates at the same speed of the motor shaft input speed, one end of the gear ratio, or translation, line 23 is set at the intersection of the 14 reference line and the $n_M$ reference line, represented by:

$$n_{14} = n_M.$$

The speed of rotation $n_s$ of the start-up clutch S is represented by a downward arrow from the zero (0) speed reference line (also indicated as $n_{15}=0$). The other end of the gear translation line 23 is set at the start-up clutch speed $n_s$. In FIG. 2, vehicle start-up has been initiated and the rotational speed of the sun gear $n_{12}$ is slightly reduced as a result of the slip interaction of the start-up clutch S. The left end of the gear translation line 23 is rising (increasing speed) and its intersection with the planet arm rotation speed $n_{15}$ indicates that the speed of the planet arm is increasing ($n_{15}>0$). This may be represented as:

$$n_s = n_{12} < i_o \times n_M.$$

(Where $i_o$=level of translation).

As shown in FIG. 1, with clutch A closed, the planet arm rotational speed $n_{15}$ is directly transmitted to the first sun gear 16 of the output planetary gear assembly 5. In FIG. 2, the speed of planet arm rotation speed $n_{15}$ translates horizontally across (dashed line) to intersect the first sun gear vertical line 16 as indicated at $n_{16}=n_{15}$. During vehicle start-up (in first gear) the planet arms 21 and 22 of the output planetary gear assembly 5 are not moveable and held fixed by closed brake D. With the planet arms 21 and 22 held stationary, the gear translation line 24 for the double output planetary gear assembly 5 is drawn between the intersection point $n_{16}=n_{15}$ on line 16 to the zero (0) point on the 21, 22 vertical line indicated as indicated at $n_{21}=n_{22}=0$. With brake D closed, and the planet arms 21, 22 held in place, the first sun gear 16 spins the planet gears 18, which in turn rotate the output ring gear 19 and the output drive shaft 2. The gear translation line 24 in FIG. 2 passes through the vertical line 19 associated with the output ring gear 19, thereby indicating the relative speed of the ring gear $n_{19}$ and the speed of the output drive shaft $n_F$.

With increasing vehicle speed the driven rotational speed, represented by the vehicle drive shaft rotational speed $n_p$ thereby increases continuously. The torque $T_S$ as applied through the start-up clutch S corresponds to the factor of the reduced degree of the actual gear translation $i_o$ of the transmission input torque $T_M$. This may be represented by:

$$T_s = T_M / i_o.$$

Figure 3:
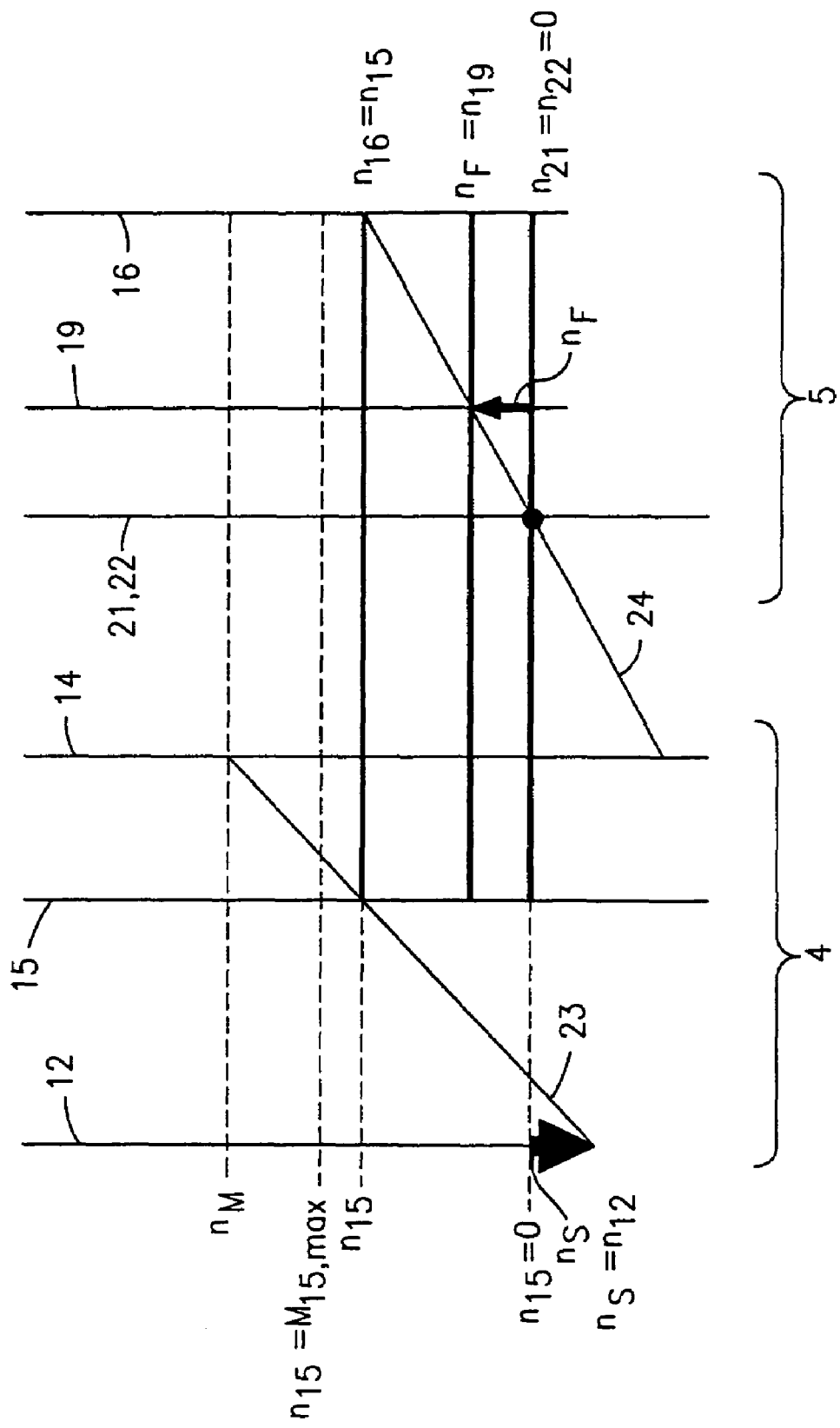
FIG. 3 is a diagram illustrating the various gear ratios and relative component speeds of the present invention illustrated in FIG. 1 when vehicle is nearing the speed at which the start-up clutch becomes fully engaged.
Figure 4:
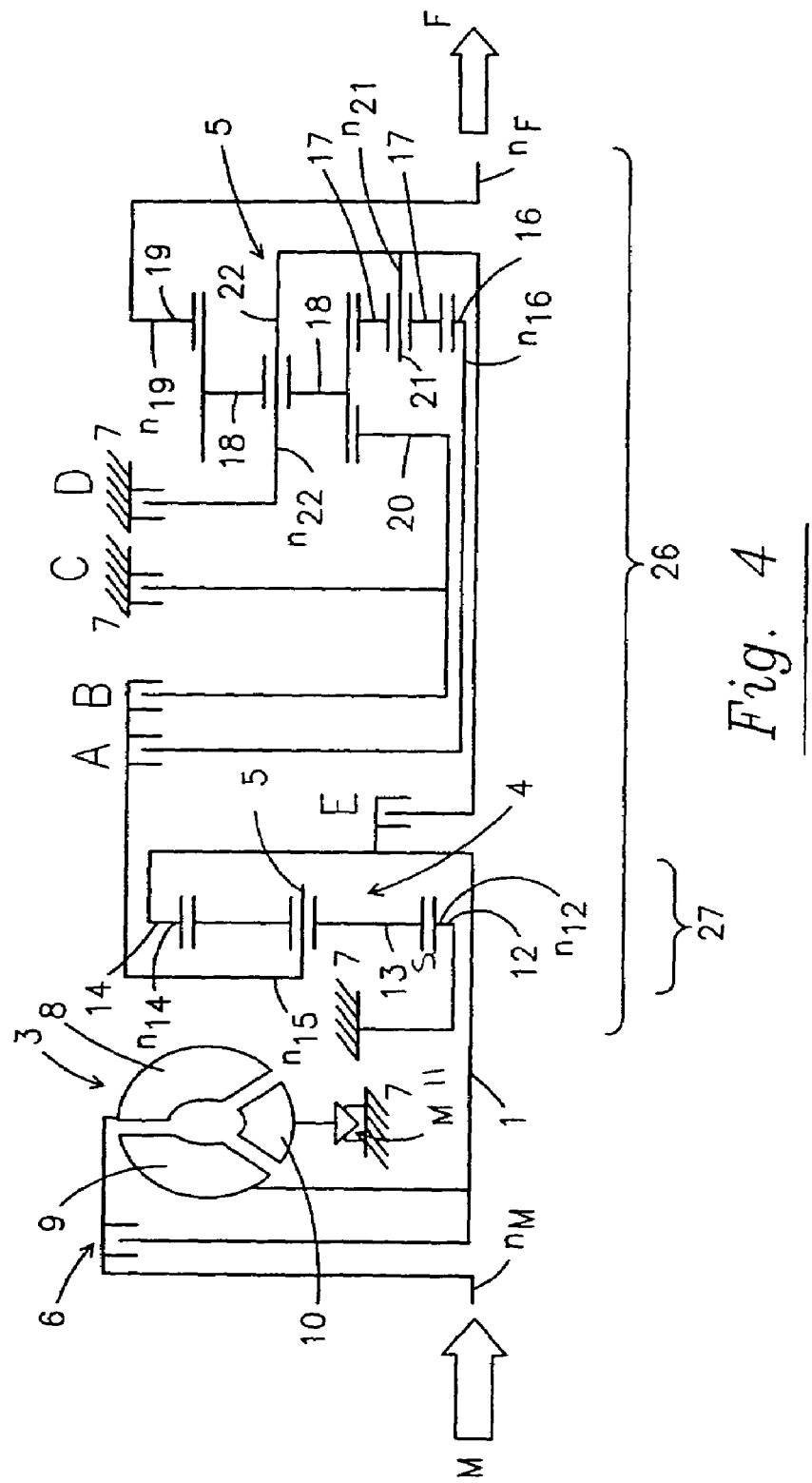
FIG. 4 a schematic illustration of a prior art automatic transmission having a hydrodynamic torque converter as start-up device.

As the pressure applied to the start-up clutch S is increased, the vehicle speed $n_F$ increases as the sun gear rotational speed $n_{12}$ decreases. More specifically, as shown in FIG. 3, the arrow representing the start-up clutch and sun gear speed $n_S = n_{12}$ decreases in negative length and moves closer to zero (0), while the arrow representing $n_F$ increases in positive length. Correspondingly, the horizontal line that represents the speed of the planet arm 15 $n_{15}$ rises toward $M_{15, max}$.

Although not shown in the FIG. 3 diagram, as the force applied to the start-up clutch S is further increased, its rotational speed $n_S$ and also the sun gear rotation speed $n_{12}$ will ultimately decrease to zero as the start-up clutch S locks the sun gear 12 to the transmission housing 7. At this point, the planet arm rotation speed $n_{15}$ of the input planetary drive 4 has increased to its maximum value $n_{15} = M_{15, max}$, which reflects the fixed relationship of the motor rotation speed $n_M$ through the gear ratio translation between the ring gear 14 and the planet gears 13. It should be appreciated that the rate of application of pressure to the start-up clutch S may be such that the start-up does not lock while the transmission is still in its first gear ratio, but that the start-up clutch S may continue to slip even as the transmission moves into higher gear ratios.

Thus, the automatic transmission of the present invention having a start-up clutch eliminates the hydrodynamic torque converter of conventional transmission thereby eliminating the associated parasitic losses and providing cost savings and increases in efficiency in its manufacture and operation over conventional transmissions. The transmission of the present invention further provides a smoothly controlled vehicle start-up from a stationary position to moving at speed.

The invention has been described in an illustrative manner. It is to be understood that the terminology, which has been used is intended to be in the nature of words of description rather than of limitation. Many modifications and variations of the invention are possible in light of the above teachings. Therefore, within the scope of the claims, the invention may be practiced other than as specifically described.

The invention claimed is:

1. An automatic transmission having a start-up clutch assembly comprising:

a transmission housing;

an input drive shaft continuously operatively connected to a motor shaft of an engine adapted to transfer torque from the engine to said transmission;

an output drive shaft operatively coupled to a vehicle drive shaft;

an input planetary gear assembly having a sun gear, a ring gear, and a plurality of planet gears disposed therebetween, said ring gear operatively connected to said input drive shaft;

an output planetary gear assembly operatively coupled to said input planetary gear assembly and said output drive shaft, said output planetary gear assembly including a double planetary gear set that has a first sun gear, a first planetary gear operatively supported by a first planet arm, a second sun gear, a second planetary gear held by a second planet arm and an output ring gear, said input planetary gear assembly and said output planetary gear assembly adapted to provide a plurality of selectively operable gear ratios between said input drive shaft and said output drive shaft; and a start-up clutch operatively disposed between said transmission housing and said sun gear and adapted to allow said sun gear to freely rotate when said start-up clutch is disengaged so that no torque is transferred from said input planetary gear assembly to said output planetary gear assembly, said start-up clutch further adapted to engage and hold said sun gear stationary so that torque is fully transferred from said input planetary gear assembly to said output planetary gear assembly, and said start-up clutch further adapted to provide a varying and controllable slipping interaction between said disengaged and engaged positions at vehicle start-up, thereby providing said vehicle with a smooth transition from stationary to moving;

wherein prior to initializing vehicle start-up, torque and rotation of said input drive shaft provided by the motor shaft of the engine is coupled directly to said ring gear so that speed of said ring gear is substantially the same as speed of the motor shaft.

2. An automatic transmission as set forth in claim 1 further including a regulator operatively coupled to said start-up clutch and adapted to provide a selectively controllable force to said start-up clutch to control a rate of start-up clutch engagement.

3. An automatic transmission as set forth in claim 1 further including a first clutch adapted to operatively engage and selectively cause a planet carrier of said input planetary gear assembly to operatively drive said first sun gear of said output planetary gear assembly, a second clutch adapted to operatively engage and selectively cause said planet carrier of said input planetary gear assembly to operatively drive said second sun gear of said output planetary gear assembly, and a third clutch adapted to operatively engage and selectively cause said ring gear of said input planetary gear assembly to operatively drive said first planetary gear of said output planetary gear assembly.

4. An automatic transmission as set forth in claim 1 further including a first brake adapted to operatively engage and selectively cause said plurality of planet gears of said input planetary gear assembly and said second sun gear of said output planetary gear assembly to be held stationary and a second brake adapted to operatively engage and selectively cause said first planet arm and said second planet arm of said output planetary gear assembly to be held stationary.

* * * * *